US011169869B1

(12) United States Patent
Kasper et al.

(10) Patent No.: US 11,169,869 B1
(45) Date of Patent: Nov. 9, 2021

(54) SYSTEM KERNEL ERROR IDENTIFICATION AND REPORTING

(71) Applicant: International Business Machines Corporation, Armonk, NY (US)

(72) Inventors: Michael Page Kasper, Poughkeepsie, NY (US); Gregg Arquero, White Plains, NY (US); Diane Marie Stamboni, Poughkeepsie, NY (US); Joshua David Steen, Fishkill, NY (US); Bryan Childs, Poughkeepsie, NY (US); Thomas William Conti, Poughkeepsie, NY (US); Andrew C. M. Hicks, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/923,134

(22) Filed: Jul. 8, 2020

(51) Int. Cl.
 *G06F 11/00* (2006.01)
 *G06F 11/07* (2006.01)

(52) U.S. Cl.
 CPC ........ *G06F 11/079* (2013.01); *G06F 11/0751* (2013.01); *G06F 11/0769* (2013.01)

(58) Field of Classification Search
 CPC .................................................. G06F 11/0766
 See application file for complete search history.

(56) References Cited

U.S. PATENT DOCUMENTS

| 6,401,218 | B1* | 6/2002 | Linam ...................... G06F 8/62 714/25 |
| 6,681,348 | B1* | 1/2004 | Vachon ............... G06F 11/0778 714/38.11 |
| 6,859,893 | B2* | 2/2005 | Hines .................. G06F 11/2294 714/38.11 |
| 8,074,116 | B2 | 12/2011 | Pardoe et al. |
| 8,918,885 | B2 | 12/2014 | Mcclure et al. |
| 9,697,069 | B2* | 7/2017 | Lee ..................... G06F 11/0748 |
| 10,613,962 | B1* | 4/2020 | Delange ............. G06F 11/3006 |
| 2002/0078404 | A1* | 6/2002 | Vachon ............... G06F 11/3636 714/38.11 |
| 2003/0028825 | A1* | 2/2003 | Hines .................. G06F 11/2294 714/37 |

(Continued)

FOREIGN PATENT DOCUMENTS

CN 106991328 B 7/2017
EP 3093787 A1 11/2016

OTHER PUBLICATIONS

Appendix 1 to the Oct. 2019 Update: Subject Matter Eligibility, p. 1-41 (Year: 2019).*

(Continued)

*Primary Examiner* — Jonathan D Gibson
(74) *Attorney, Agent, or Firm* — Cantor Colburn LLP; Teddi Maranzano

(57) ABSTRACT

Techniques for system kernel error identification and reporting for a computer system are described herein. An aspect includes detecting an error during the execution of a program. Another aspect includes determining whether the error is a system kernel error in the program. Another aspect includes, based on determining that the error is a system kernel error, generating a report regarding the determined system kernel error.

14 Claims, 4 Drawing Sheets

(56) References Cited

U.S. PATENT DOCUMENTS

| | | | |
|---|---|---|---|
| 2004/0117620 A1* | 6/2004 | Rothrock | G06F 21/14 |
| | | | 713/164 |
| 2012/0066556 A1* | 3/2012 | Dufour | G06F 11/0712 |
| | | | 714/49 |
| 2013/0007886 A1 | 1/2013 | Tripp et al. | |
| 2014/0123238 A1* | 5/2014 | Bacher | G06F 21/57 |
| | | | 726/4 |
| 2015/0007315 A1 | 1/2015 | Rivera et al. | |
| 2015/0324478 A1 | 11/2015 | Zhao et al. | |
| 2017/0271027 A1 | 9/2017 | Childs et al. | |
| 2019/0065301 A1* | 2/2019 | Tsirkin | G06F 11/0715 |
| 2019/0310883 A1* | 10/2019 | Wang | G06F 9/545 |

OTHER PUBLICATIONS

"z/OS Version 2 Release 4 Authorized Code Scanner Guide," International Business Machines Corporation, Published Jun. 16, 2020, 66 pages.

\* cited by examiner

SYSTEM KERNEL ERROR IDENTIFICATION AND REPORTING

BACKGROUND

The present invention generally relates to computer systems, and more specifically, to system kernel error identification and reporting for a computer system.

An operating system may include features and facilities specifically designed to protect one program from affecting another, either intentionally or accidentally. The ability of an operating system to protect data and itself from unauthorized changes is called system integrity. An authorized program may run in superuser or supervisor state, and/or is authorized through an authorization facility. An unauthorized program may be a program that runs in problem state or user state and is not authorized though any authorization facility. System integrity support may restrict unauthorized programs.

Storage protection keys in various forms are utilized on many computing platforms to provide an added security mechanism. Storage protection keys have the following elements: (a) each virtual memory page is assigned a small integer key value, (b) an indication whether that key applies to fetch protection or merely protects write access, and (c) a corresponding execution key for the unit of work. Generally, the execution key must match the corresponding memory. There may be a specially designated execution key value that can access any storage key, and similarly there may be a specially designated virtual memory key that can be accessed by any execution key.

An exemplary violation of computer storage protected by storage protection keys may include an unauthorized user passing bad addresses to a system service. The system service could be running with an authorized key, and if it trusts the user supplied address, could indirectly provide that user read or even write access to storage to which that user should not have access. Another violation of computer storage protection may include buffer overflows. When parameter areas include variable-length fields, transfers of data can overflow when the boundaries of those length fields are not checked. A third exemplary violation of computer storage protection may include system-owned control blocks. When an unauthorized user passes an address to a system-owned control block, the system service must verify that block through an independently anchored chain. Otherwise, an unauthorized user could spoof the control block in order to cause that system service to take various actions that it would otherwise not take. A fourth exemplary violation of computer storage protection may include an invalid index number. When parameter areas include an index number that is used to reference system storage, the index value must be checked to verify it is in the expected range before it is used or else unexpected storage could be used, violating store, fetch, or even execution protections. A fifth exemplary violation of computer storage protection may include a serialization problem. When storage is freed or reused by one task or address space while it is still being used by another, unexpected storage can be used violating store, fetch, or execution protection. A sixth exemplary violation of computer storage protection may include privilege escalation. When a parameter area from an unauthorized caller includes the address of a program and the program is run in an authorized state, a privilege escalation violation has occurred.

SUMMARY

Embodiments of the present invention are directed to system kernel error identification and reporting for a computer system. A non-limiting example computer-implemented method includes detecting an error during the execution of a program. The method also includes determining whether the error is a system kernel error in the program. The method also includes, based on determining that the error is a system kernel error, generating a report regarding the determined system kernel error.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
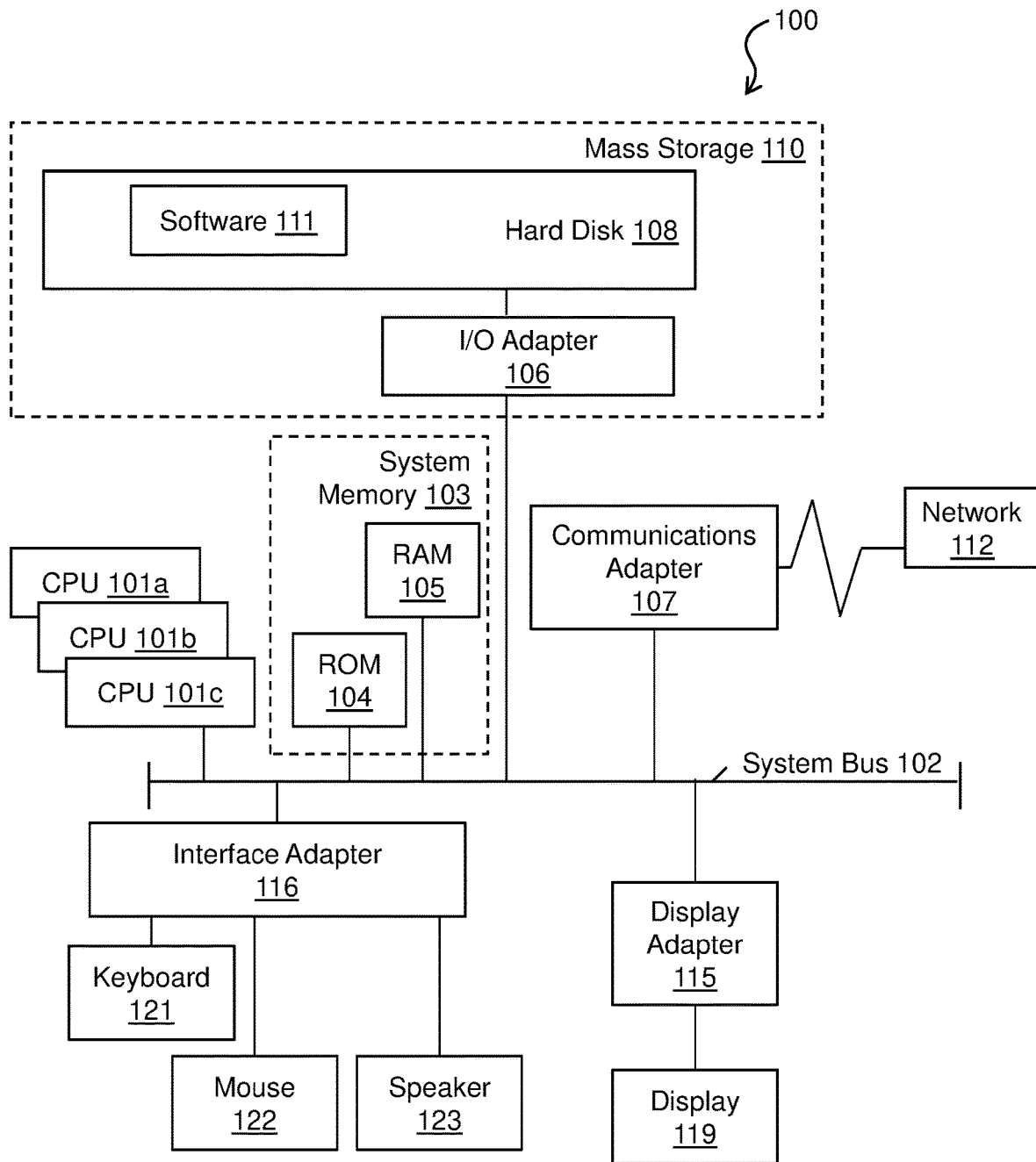
FIG. 1 is a block diagram of an example computer system for use in conjunction with one or more embodiments of system kernel error identification and reporting.

One or more embodiments of the present invention provide system kernel error identification and reporting for a computer system. System kernel errors in computer programs may be difficult to identify using dynamic scanning and static scanning tools. Code paths that may contain system kernel errors may only be driven in special circumstances that are not replicated during testing. Therefore, some system kernel errors may only be found by monitoring applications for errors, such as program exceptions, in real time during execution. Information regarding a detected system kernel error may be analyzed and used to produce a system kernel error report. System kernel errors may be detected in any appropriate computer system, including test and production environments. Programs (or applications) may be executed by an operating system in a test or production environment, and program exceptions corresponding to failing instructions may be caused by any program at any time during running of programs. Any program exceptions may be detected and analyzed to determine whether the program exception constitutes a system kernel error. Program exceptions that include store violations, fetch violations, and privilege escalation may be determined to be system kernel errors. Even if a failing instruction does not successfully read, write, or execute code that it should not, the failing instruction reveals a flaw in an authorized program that is causing the exception. If the failing instruction had not caused an exception, the failing instruction may have read or written data or executed code that it should not have, and bypassed system integrity to do so, causing a system kernel error that may be exploited. In some cases, harmless errors may be caused intentionally instead. The analysis of the exception may depend on attributes of the system storage being incorrectly referenced.

An event listener may receive system notifications of errors that occur during program execution, such as program check events or program exception events. The event listener may receive the error notifications from an operating system via an application programming interface (API). An error notification that is detected by an event listener may include a program check code in some embodiments. The event listener may also receive diagnostic information regarding the error from the operating system.

An error analyzer may receive notifications regarding any detected errors from the event listener and analyze the associated diagnostic information to identify system kernel errors. Some examples of errors that may be determined to be system kernel errors by the error analyzer include fetch protection exceptions, store protection exceptions, and instruction exceptions. A fetch protection exception may indicate a flaw in authorized code that could allow access to confidential data by an unauthorized program. A store protection exception may indicate that there is a flaw in authorized code that could overwrite data belonging to another program. An instruction exception may indicate that a program is running under elevated privileges (e.g., supervisor state) that the program is not supposed to have.

A system kernel error reporter may package relevant data about the determined system kernel error into a report format, write the report to a file, and notify an administrator regarding the location of the file that includes the report. System diagnostic dumps and system log information may also be captured and saved for the error. The report may include any appropriate information regarding an error, including but not limited to: a time of error, a type of error, data regarding a failing instruction, address translation exception information, program name and offset, failing instruction storage attributes, failing address spaces and job names, general purpose register contents, access register contents, storage contents pointed to by registers, storage key or other attributes of a storage area that is pointed to by a register.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
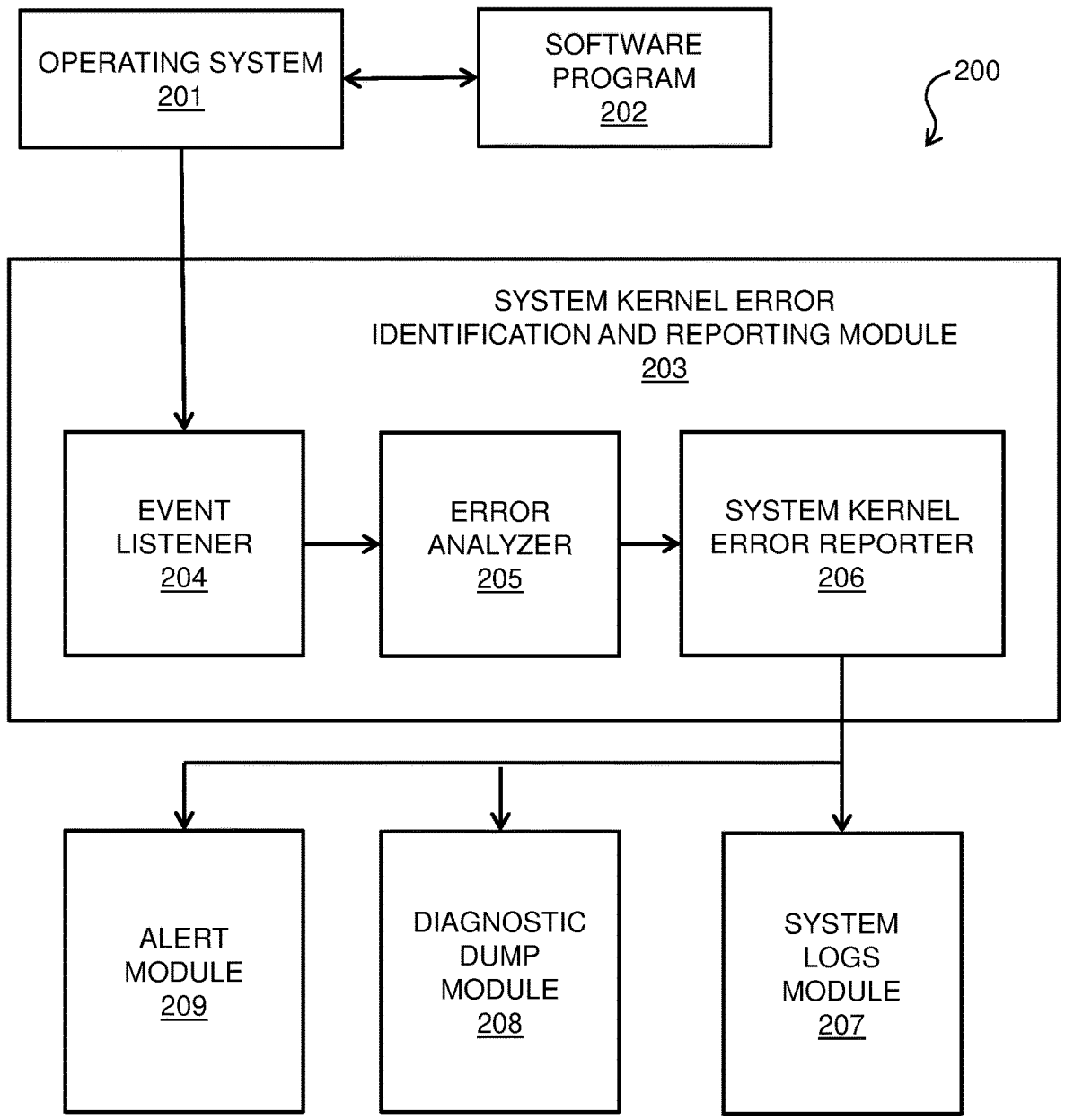
FIG. 2 is a block diagram of components of a system for system kernel error identification and reporting in accordance with one or more embodiments of the present invention.

Turning now to FIG. 2, a system 200 that includes system kernel error identification and reporting is generally shown in accordance with one or more embodiments of the present invention. System 200 may be implemented in conjunction with any appropriate computer system, such as computer system 100 of FIG. 1. System 200 may include a test environment or production environment in various embodiments. Operating system 201 of system 200 manages execution of software programs, such as software program 202, in the system 200, and handles instruction processing, memory operations such as fetches and stores, and input/output operations for program 202. Operating system 201 may include any operating system that is executing programs or applications on any appropriate computer system, such as computer system 100 of FIG. 1. System kernel error identification and reporting module 203 is in communication with operating system 201 during execution of the operating system 201. Based on operating system 201 encountering an error during execution of a program 202, event listener 204 may detect the encountered error (e.g., based on a notification from the operating system 201), and notify error analyzer 205 regarding the detected error. In some embodiments, event listener 204 may be called by the operating system 201 based on the error via an API, and the operating system 201 may provide diagnostic information regarding the error to event listener 204. Any appropriate information may be received by the event listener 204 from operating system 201 regarding an error, including but not limited to an instruction address of program 202 and an execution state of the program 202 that generated the error.

Error analyzer 205 may determine whether the error is a system kernel error based on the diagnostic information from the operating system 201 regarding the error. System kernel errors that may be identified by error analyzer 205 include fetch protection exceptions, store protection exceptions, and instruction exceptions. A fetch protection exception may indicate a flaw in authorized code that could allow access to confidential data by an unauthorized program. A store protection exception may indicate that there is a flaw in authorized code that could overwrite data belonging to another program. An instruction exception may indicate that a program is running under elevated privileges (e.g., superuser) that the program is not supposed to have. Operation of error analyzer 205 is discussed in further detail with respect to method 300 of FIGS. 3A-B.

For an error that was determined to be a system kernel error by error analyzer 205, system kernel error reporter 206 collects and processes information regarding the determined system kernel error into a report. The information may be processed via an alert module 209, diagnostic dump module 208, and system logs module 207. The alert module may alert a security event information manager (SEIM) module regarding the error in some embodiments. The alert module 209 may also notify an administrator of the system regarding the error in some embodiments; the notification may include a location in memory of a report containing information regarding the error. The diagnostic dump module 208 may capture and save dump information that is related to the error for inclusion in the report that is generated by system kernel error reporter 206. The system logs module 207 may capture and save system log information that is related to the error for inclusion in the report that is generated by system kernel error reporter 206. The system logs module 207 may obtain data from any appropriate system logs in the system 200, such as a system log or an operator console log. The system kernel error reporter 206 may package any relevant data about the determined system kernel error into a report format, write the report to a file that is saved in a memory of the system 200, and notify an administrator regarding the location of the file that includes the report via alert module 209. The report may include any appropriate information regarding an error, including but not limited to: a time of error, a type of error, data regarding a failing instruction, address translation exception information, program name and offset, failing instruction storage attributes, failing address spaces and job names, general purpose register contents, access register contents, storage contents pointed to by registers, storage key or other attributes of a storage area that is pointed to by a register. A program associated with the system kernel error may be identified in some embodiments; in such embodiments, the program may be patched based on identification of the system kernel error by system kernel error identification and reporting module 203. The error report that is generated by the system kernel error reporter 206 may be configured in any appropriate manner to include any appropriate information in various embodiments. An administrator of system 200 may take any appropriate action regarding the report to mitigate the detected system kernel error based on the report from the system kernel error reporter 206.

It is to be understood that the block diagram of FIG. 2 is not intended to indicate that the system 200 is to include all of the components shown in FIG. 2. Rather, the system 200 can include any appropriate fewer or additional components not illustrated in FIG. 2 (e.g., additional memory components, embedded controllers, functional blocks, connections between functional blocks, modules, inputs, outputs, etc.). Further, the embodiments described herein with respect to system 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3A:
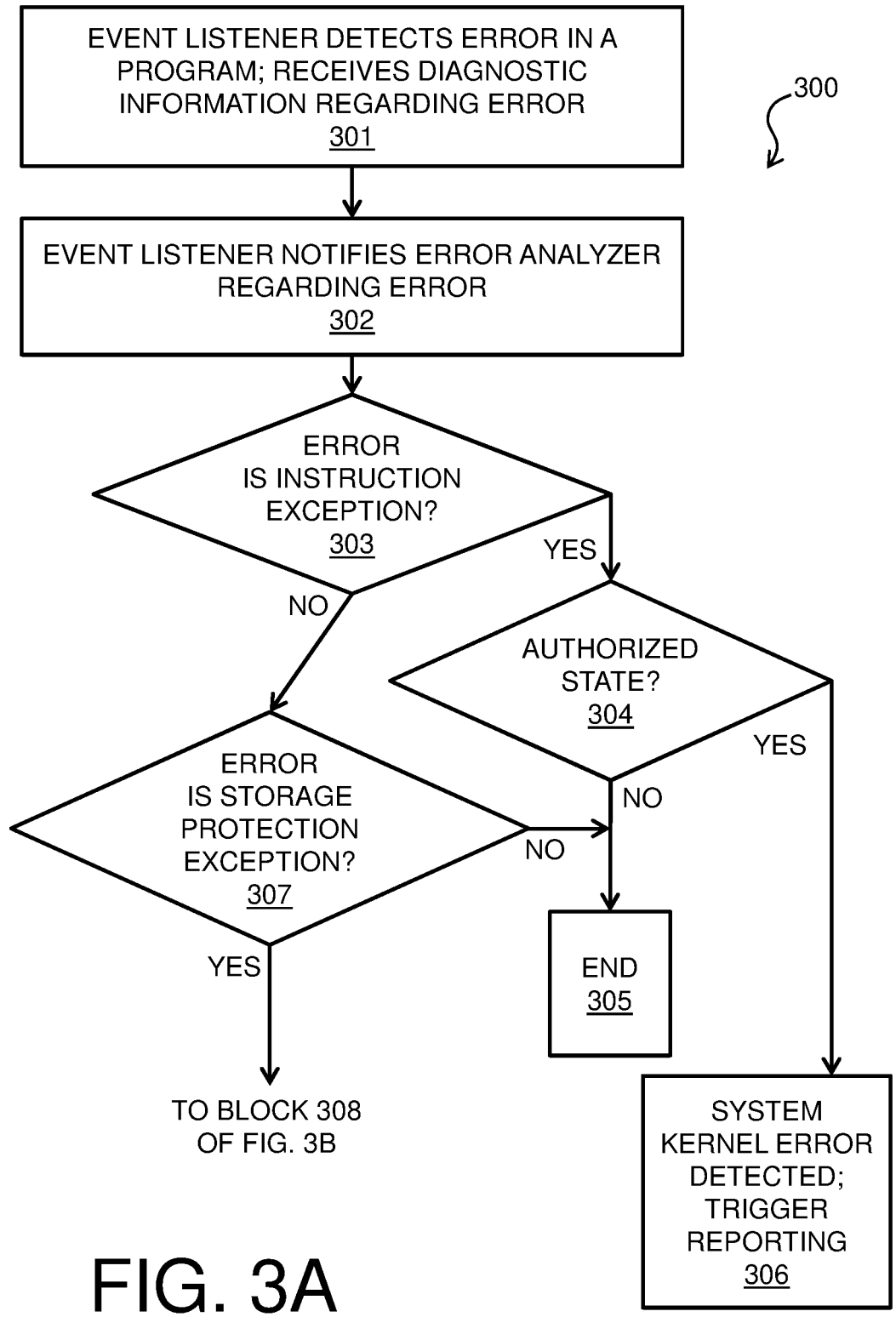
FIGS. 3A-B are a flow diagram of a process for system kernel error identification and reporting in accordance with one or more embodiments of the present invention.
Figure 3B:
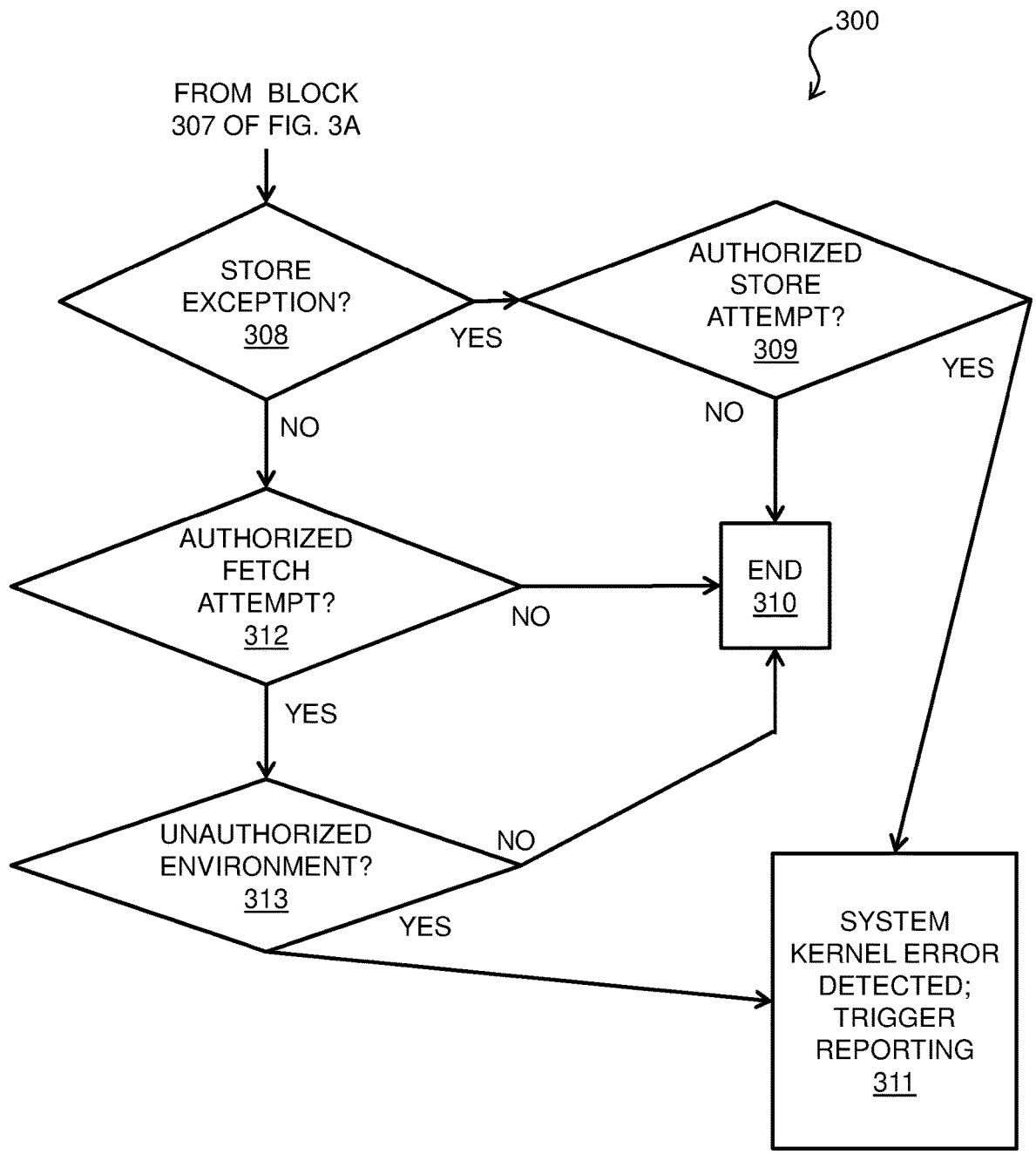

FIGS. 3A-B show a process flow diagram of a method 300 for system kernel error identification and reporting in accordance with one or more embodiments of the present invention. Method 300 may be implemented in conjunction with any appropriate computer system such as computer system 100 of FIG. 1. Embodiments of method 300 may be implemented in system 200 of FIG. 2. In block 301 of method 300 of FIG. 3A, operating system 201 encounters an error in a program 202 that is executing in a computer system, and the error is detected by event listener 204 in system kernel error identification and reporting module 203. In some embodiments, the operating system 201 may notify the event listener 204 regarding the error. The operating system 201 may provide diagnostic information regarding the error to event listener 204 in block 301. Error analyzer 205 is notified of the error by event listener 204 in block 302, and event listener 204 provides information regarding the error to error analyzer 205 in block 302. The error analyzer 205 may receive any appropriate information regarding the error in block 302, including but not limited to an identifier of program 202, an identifier of the instruction or operation that caused the error, an execution state of the program 202, an address space targeted by the error, and additional diagnostic data.

In block 303, it is determined by error analyzer 205 whether the error is an instruction exception. If it is determined in block 303 that the error is an instruction exception, flow proceeds from block 303 to block 304. In block 304, it is determined whether the program 202 that generated the instruction exception was running in an authorized state. If it is determined in block 304 that the program 202 that generated the instruction exception was not running in an authorized state at the time of the error, flow proceeds from block 304 to block 305. In block 305, it is determined that the error is not a system kernel error, no action is taken, and method 300 ends. If it is determined in block 304 that the program 202 that generated the instruction exception was running in an authorized state at the time of the error, flow proceeds from block 304 to block 306. In block 306, the instruction exception is determined to be a system kernel error based on the elevated privileges of the program 202 that generated the instruction exception. In block 306, system kernel error reporter 206 is triggered by error analyzer 205 to generate a report regarding the instruction exception (using, for example, diagnostic dump module 208 and system logs module 207) and manage any alerts regarding the error via alert module 209.

If it was determined in block 303 that the error is not an instruction exception, flow proceeds from block 303 to block 307. In block 307, it is determined whether the error is a storage protection exception (e.g., a store exception or fetch exception). If it is determined in block 307 that the error is not a storage protection exception, flow proceeds from block 307 to block 305, in which it is determined that the error is not a system kernel error, no action is taken, and method 300 ends. If it is determined in block 307 that the error is a storage protection exception, flow proceeds from block 307 in FIG. 3A to block 308 in FIG. 3B.

In block 308 of method 300 of FIG. 3B, it is determined whether the storage protection exception that was determined in block 307 is a store exception. If it is determined in block 308 that the storage protection exception is a store exception, flow proceeds from block 308 to block 309. In block 309, it is determined whether the store exception is an authorized store attempt. If it is determined in block 309 that the store exception is not an authorized store attempt, flow proceeds from block 309 to block 310, in which it is determined that the store exception is not a system kernel error, no action is taken, and method 300 ends. If it is determined in block 309 that the store exception is an authorized store attempt, flow proceeds from block 309 to block 311, the store exception is determined to be a system kernel error based on the elevated privileges of the program 202 that generated the store exception. In block 311, system kernel error reporter 206 is triggered by error analyzer 205 to generate a report regarding the store violation (using, for example, diagnostic dump module 208 and system logs module 207), and manage any alerts regarding the error via alert module 209.

If it is determined in block 308 that the storage protection exception that was determined in block 307 is not a store exception, it is determined that the storage protection exception is a fetch exception, and flow proceeds from block 308 to block 312. In block 312, it is determined whether the fetch exception is an authorized fetch attempt. If it is determined in block 312 that the fetch exception is not an authorized fetch attempt, flow proceeds from block 312 to block 310, in which it is determined that the fetch exception is not a system kernel error, no action is taken, and method 300 ends.

If it is determined in block 312 that the fetch exception is an authorized fetch attempt, flow proceeds from block 312 to block 313. In block 313, it is determined whether the program 202 that generated the authorized fetch attempt was running in an unauthorized environment at the time of the fetch exception. If it is determined in block 313 that the program 202 that generated the authorized fetch attempt was not running in an unauthorized environment, flow proceeds from block 313 to block 310. In block 310, it is determined that the authorized fetch attempt is not a system kernel error, no action is taken, and method 300 ends. If it is determined in block 313 that the program 202 that generated the authorized fetch attempt was running in an unauthorized environment, flow proceeds from block 313 to block 311. In block 311, the authorized fetch attempt is determined to be a system kernel error due to the unauthorized environment at the time of the authorized fetch attempt. In block 311, system kernel error reporter 206 is triggered by error analyzer 205 to generate a report regarding the authorized fetch attempt (using, for example, diagnostic dump module 208 and system logs module 207), and manage any alerts regarding the error via alert module 209.

The process flow diagram of FIGS. 3A-B is not intended to indicate that the operations of the method 300 are to be executed in any particular order, or that all of the operations of the method 300 are to be included in every case. Additionally, the method 300 can include any suitable number of additional operations.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   executing, by a processor, a program including a plurality of instructions addresses;
   detecting, by the processor, an error included in the program during the execution of the program;
   in response to detecting the error, determining by the processor a targeted instruction address among the plurality of instructions addresses that generated the error;
   determining whether the error is a system kernel error in the program based on the targeted instruction address that generated error; and
   based on determining that the error is a system kernel error, generating a report regarding the determined system kernel error,
   wherein detecting the error comprises calling an event listener by an operating system based on the error, providing by the operating system diagnostic information regarding the error to the event listener, and analyzing by event analyzer the diagnostic information regarding the error to determine whether the error is a system kernel error, and
   wherein the error is determined to be a system kernel error based on determining that the error comprises one of a fetch exception, a store exception, and an instruction exception.

2. The method of claim 1, wherein determining that the error is a system kernel error comprising a fetch exception comprises:
   determining whether the error is an authorized fetch attempt;
   based on determining that the error is an authorized fetch attempt, determining whether the program was running in an unauthorized environment at a time of the fetch exception corresponding to the error; and
   based on determining that the program was running in the unauthorized environment, determining that the error is a system kernel error in the program.

3. The method of claim 1, wherein determining that the error is a system kernel error comprising a store exception comprises:
- determining whether the error is an authorized store attempt; and
- based on determining that the error is an authorized store attempt, determining that the error is a system kernel error in the program.

4. The method of claim 1, wherein determining that the error is a system kernel error comprising an instruction exception comprises:
- determining whether the program was running in an authorized state at a time of the instruction exception corresponding to the error; and
- based on determining that the program was running in the authorized state, determining that the error is a system kernel error in the program.

5. The method of claim 1, wherein generating the report regarding the determined system kernel error comprises:
- determining dump data associated with the system kernel error;
- determining log data associated with the system kernel error;
- saving the determined dump data and log data in a file corresponding to the report; and
- generating a notification of the system kernel error and a location of the file.

6. A system comprising:
- one or more memories having computer readable instructions; and
- one or more processors for executing the computer readable instructions, the computer readable instructions controlling the one or more processors to perform operations comprising:
  - executing, by a processor, a program including a plurality of instructions addresses;
  - detecting, by the processor, an error included in the program during the execution of the program;
  - in response to detecting the error, determining by the processor a targeted instruction address among the plurality of instructions addresses that generated the error;
  - determining whether the error is a system kernel error in the program based on the targeted instruction address that generated error; and
  - based on determining that the error is a system kernel error, generating a report regarding the determined system kernel error
  - wherein detecting the error comprises calling an event listener by an operating system based on the error, providing by the operating system diagnostic information regarding the error to the event listener, and analyzing by event analyzer the diagnostic information regarding the error to determine whether the error is a system kernel error, and
  - wherein the error is determined to be a system kernel error based on determining that the error comprises one of a fetch exception, a store exception, and an instruction exception.

7. The system of claim 6, wherein determining that the error is a system kernel error comprising a fetch exception comprises:
- determining whether the error is an authorized fetch attempt;
- based on determining that the error is an authorized fetch attempt, determining whether the program was running in an unauthorized environment at a time of the fetch exception corresponding to the error; and
- based on determining that the program was running in the unauthorized environment, determining that the error is a system kernel error in the program.

8. The system of claim 6, wherein determining that the error is a system kernel error comprising a store exception comprises:
- determining whether the error is an authorized store attempt; and
- based on determining that the error is an authorized store attempt, determining that the error is a system kernel error in the program.

9. The system of claim 6, wherein determining that the error is a system kernel error comprising an instruction exception comprises:
- determining whether the program was running in an authorized state at a time of the instruction exception corresponding to the error; and
- based on determining that the program was running in the authorized state, determining that the error is a system kernel error in the program.

10. The system of claim 6, wherein generating the report regarding the determined system kernel error comprises:
- determining dump data associated with the system kernel error;
- determining log data associated with the system kernel error;
- saving the determined dump data and log data in a file corresponding to the report; and
- generating a notification of the system kernel error and a location of the file.

11. A computer program product comprising a computer readable storage medium having program instructions embodied therewith, the program instructions executable by one or more processors to cause the one or more processors to perform operations comprising:
- executing, by a processor, a program including a plurality of instructions addresses;
- detecting, by the processor, an error included in the program during the execution of the program;
- in response to detecting the error, determining by the processor a targeted instruction address among the plurality of instructions addresses that generated the error;
- determining whether the error is a system kernel error in the program based on the targeted instruction address that generated error; and
- based on determining that the error is a system kernel error, generating a report regarding the determined system kernel error,
- wherein detecting the error comprises calling an event listener by an operating system based on the error, providing by the operating system diagnostic information regarding the error to the event listener, and analyzing by event analyzer the diagnostic information regarding the error to determine whether the error is a system kernel error, and
- wherein the error is determined to be a system kernel error based on determining that the error comprises one of a fetch exception, a store exception, and an instruction exception.

12. The computer program product of claim 11, wherein determining that the error is a system kernel error comprising a fetch exception comprises:
- determining whether the error is an authorized fetch attempt;

based on determining that the error is an authorized fetch attempt, determining whether the program was running in an unauthorized environment at a time of the fetch exception corresponding to the error; and based on determining that the program was running in the unauthorized environment, determining that the error is a system kernel error in the program.

13. The computer program product of claim 11, wherein determining that the error is a system kernel error comprising a store exception comprises:

determining whether the error is an authorized store attempt; and based on determining that the error is an authorized store attempt, determining that the error is a system kernel error in the program.

14. The computer program product of claim 11, wherein determining that the error is a system kernel error comprising an instruction exception comprises:

determining whether the program was running in an authorized state at a time of the instruction exception corresponding to the error; and based on determining that the program was running in the authorized state, determining that the error is a system kernel error in the program.

* * * * *